H. S. HAWKINS, A. M. GREEN & I. W. GIBBINS.
STORAGE BATTERY.
APPLICATION FILED MAR. 7, 1914.
1,159,021. Patented Nov. 2, 1915.
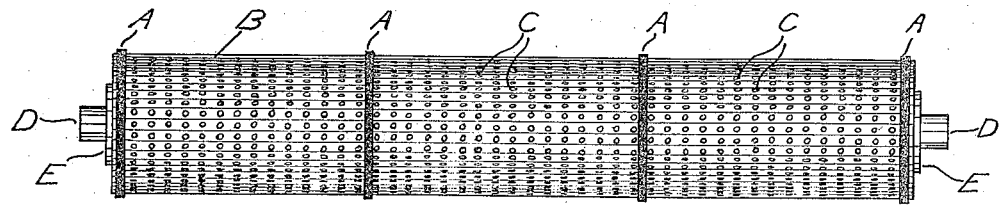
Fig. 1.
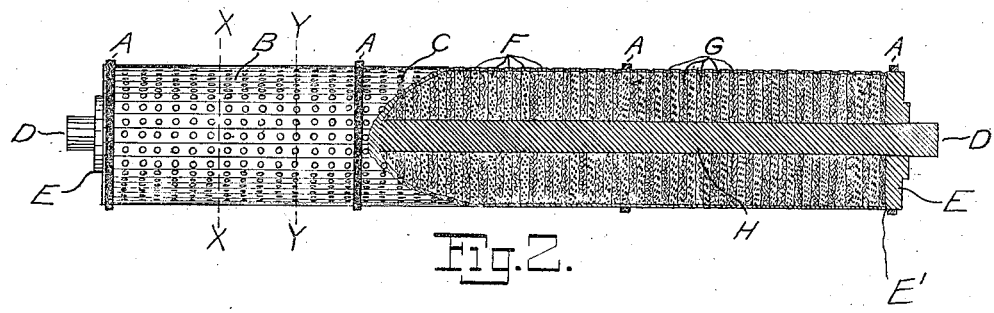
Fig. 2.
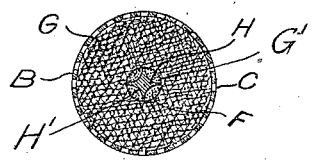
Fig. 3.
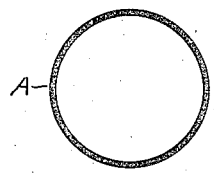
Fig. 4.
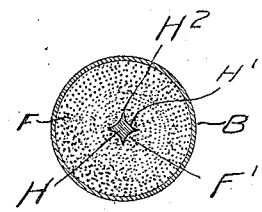
Fig. 5.
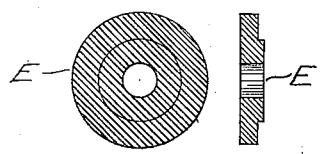
Fig. 6. Fig. 7.
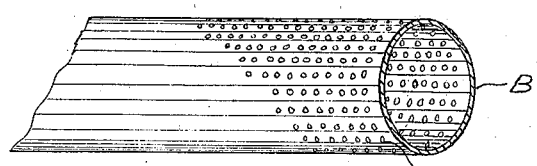
Fig. 8.
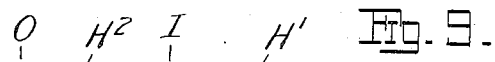
Fig. 9.
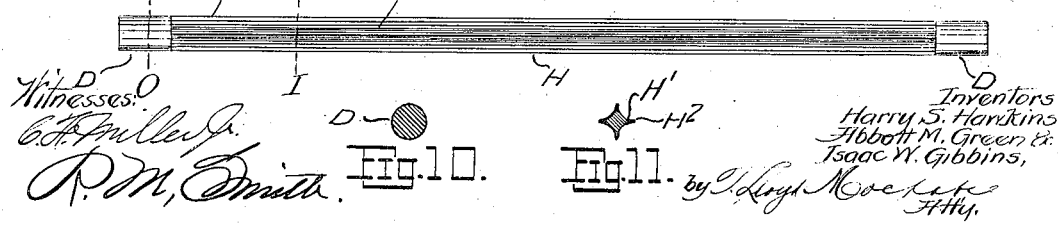
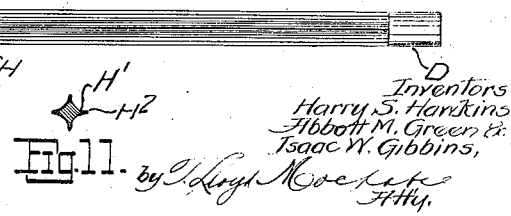
Fig. 10. Fig. 11.
Witnesses:
Inventors:
Harry S. Hawkins,
Abbott M. Green &
Isaac W. Gibbins,
by their Atty.

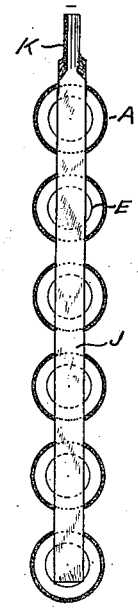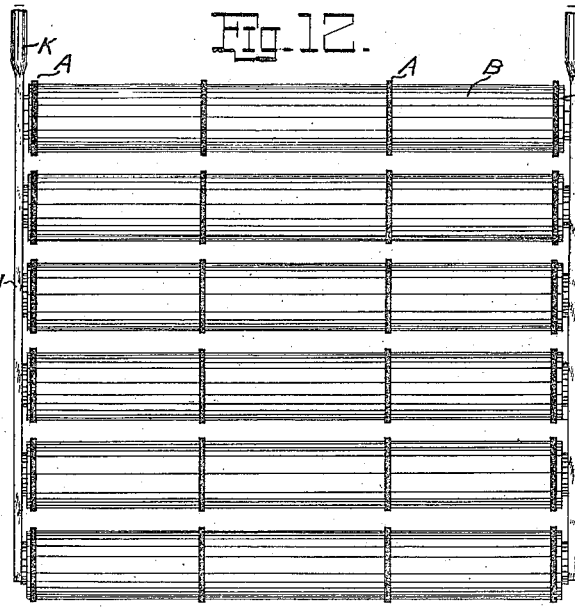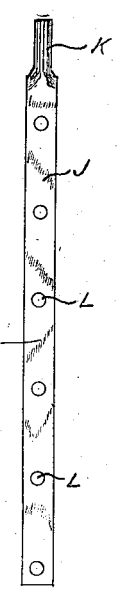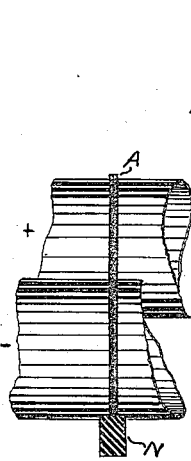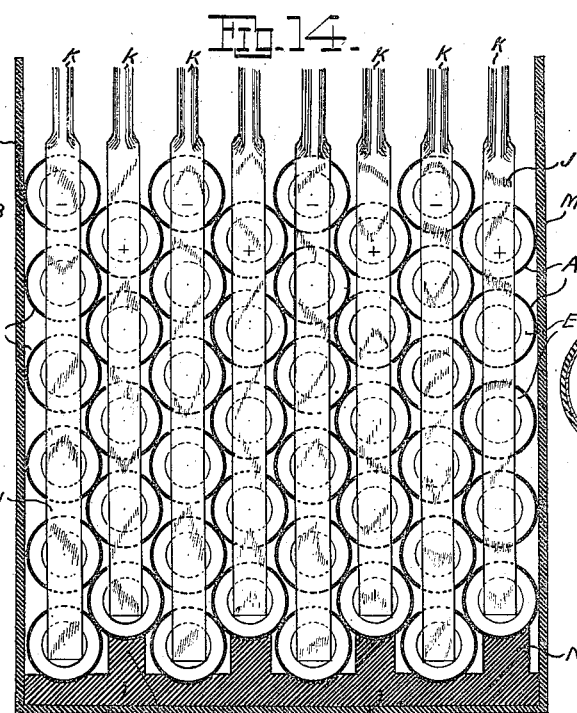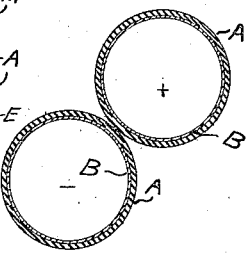

UNITED STATES PATENT OFFICE.

HARRY S. HAWKINS, ABBOTT M. GREEN, AND ISAAC W. GIBBINS, OF ALTURAS, CALIFORNIA.

STORAGE BATTERY.

1,159,021.   Specification of Letters Patent.   Patented Nov. 2, 1915.

Application filed March 7, 1914. Serial No. 823,159.

*To all whom it may concern:*

Be it known that we, HARRY S. HAWKINS, ABBOTT M. GREEN, and ISAAC W. GIBBINS, all citizens of the United States, residing at Alturas, in the county of Modoc and State of California, have invented certain new and useful Improvements in Storage Batteries, of which the following is a specification.

This invention relates to storage batteries; and it has for an object to provide a battery that will increase the exposed surface of the active material to the action of the electrolyte, with a resultant increase in the current capacity.

It is a purpose of the invention to construct disks of active material and confine them between elements of porous material whereby to protect the active material from disintegration and to expose the surface of the active material to the action of the electrolyte, and further the construction of the porous elements which will possess such inherent qualities as will render the same susceptible of contraction and expansion to accommodate for the expansive and contractive force of the active material.

It is also an object of the invention to provide a core inlaid with the active material, disks of active material mounted concentrically on the core and porous materials interposed between the active disks and a foraminous sleeve surrounding the porous and metal disks, and further, the provision of rings of insulation carried by the sleeve to space the negative and positive elements from each other.

It is further aimed to provide a battery element in which it will be impossible for the active material to become dislodged or loosened from its supporting grid and thereby increase its life and eliminate the necessity of cleaning the battery, and further, the provision of such porous material which will serve as a retainer and which will minimize the resistance to the free passage of the electrolyte to the surface of the active material and thereby prevent any decrease in the capacity of the battery through its use, especially on heavy discharge rates of current.

With these and other objects in view, the invention consists of certain novel features of construction, combination and arrangement of parts and materials as will be hereinafter described and claimed.

In the accompanying drawings:—Figure 1 is a side view of one of the units; Fig. 2 is a similar view with parts broken away and parts in section; Fig. 3 is a section on line Y—Y of Fig. 2; Fig. 4 is a side view of one of the insulating and separating rings; Fig. 5 is a section on line X—X of Fig. 2; Fig. 6 is an end view of one of the sealing caps; Fig. 7 is a vertical section therethrough; Fig. 8 is a perspective view of a portion of one of the foraminated casings of the unit; Fig. 9 is a side view of the conductor; Fig. 10 is a section on line O—O of Fig. 9; Fig. 11 is a section on line I—I of Fig. 9; Fig. 12 is a side view of one of the complete elements; Fig. 13 is an end view thereof; Fig. 14 is a vertical section through the complete battery, showing the negative and positive elements operatively arranged in the receiving cell; Fig. 15 is a side view of one of the active connecting bars; Fig. 16 is a side view of two negative and positive units, showing the manner of insulating and separating the same from each other; and Fig. 17 is a vertical section therethrough.

The different units relied upon to constitute the complete battery are identically constructed, and it is believed that a description of one will suffice for all, and it is briefly or specifically described, with particular reference to Figs. 1 to 11, inclusive, that each unit comprises a foraminous tube B of any suitable material such as lead alloy, of any convenient or desired length and of a suitable diameter and preferably provided with walls of uniform thickness approximating one-thirty-second of an inch. Within the tube are arranged layers or disks F of active material such as lead oxid, each being approximately of a one-sixteenth of an inch thickness and sandwiched or alternately associated with similar disks G of porous material which may be volcanic scoria because of its porosity and lightness, the flat sides of the porous disks being arranged in mutual contact with the corresponding flat sides of the adjacent active disks, as clearly shown in Fig. 2. All of these disks are built up upon a conductor H of lead alloy. At distances upon the tube B that are equal to the distance between the porous disks are circular series of perforations C by means of which the electrolyte may enter the disks, as will be understood. The conductor H is provided with longitudinal channels H' of substantially U-form, and with particular reference to Figs. 3 and 5 of the drawings, it will be seen that the walls of these channels gradually merge into each other so that they define uninterrupted longitudinally extending relatively sharp edges H². While the conductor H is herein described as having longitudinal U-shaped channels, it is desired to be understood that any other form of construction may be resorted to, the particular form of construction of the said conductor not being considered an essential feature of this invention. The active disks are so constructed at their centers that portions F' of said disks are inlaid in the channels H', while the centers of the porous disks G are provided with circular openings G', whose walls are only in contact with the said edges H² of the conductor.

The ends of the tube are closed by heads or caps E of suitable material. These heads are joined at E' to the tube, so that the ends of the latter are completely sealed and the elements of the unit, in their entirety are practically converted into a solid body. The structure as thus contemplated also forms a desirable supporting grid for the active materials so that the current may be properly carried to and from said materials, as will be understood. Around the tube and at suitable points thereon are secured rings A of insulating material, which are adapted to insulate and separate different units from each other, as will be hereinafter fully explained. These rings may be made of hard rubber, celluloid or any other well known and desirable insulating material. The conductor H is provided with ends D that are extended through the central portions of the heads E.

With reference to Figs. 12 and 13 wherein companion units of a construction as set forth in the foregoing are employed to form a complete plate section or electrode of the battery, it is described that the units are arranged superimposed and spaced from each other and the ends D are extended into correspondingly formed openings L in strips K' of conducting material. After the said ends D are arranged in the openings L as mentioned, the strips are fused so as to completely seal the joints of connection between the plates and the conductors.

With reference to Fig. 14 of the drawings, it is shown how the cell is completed through the provision of an equal number of plates of the character hereinbefore mentioned, excepting that the alternate plates contain less and a greater number, respectively, of units or tubes. Certain of the plates consist of an even number of units, while the next adjacent plate consists of an unequal number of units. However, as is apparent from the above, it is deemed well to say that this exact arrangement is not absolutely necessary to the completion of the battery, as each of the plates or electrodes may consist of the same number of units or tubes.

The containing cell M is provided with an insulating bottom N, which is provided with continuous vertical rests N', that are spaced from each other and which are adapted to support the adjacent upper electrodes or plates. The different negative or positive electrodes or plates as arranged in Fig. 14 are such that the units or tubes of the plates are alternately sandwiched with each other. In other words, the electrodes containing the unequal number of units or tubes are arranged so that they extend approximately into the spaces between the units of the next adjacent electrodes and the insulating rings A of the units between the tubes of the adjacent electrodes are arranged touching each other. In this manner one electrode is separated and insulated from the other, as will be understood.

As stated one of the primary objects of the invention set forth in this application is the provision of a battery that will increase the exposed surface of the active material to the action of the electrolyte, with a resultant increase in the current capacity and it will now be fully pointed out wherein the battery is constructed with a view to overcoming many of the disadvantages of the well known form of "Pasted electrode" battery. In the form of pasted plate or electrode, in order to obtain the maximum current from the active material it is necessary that every particle of said material shall come in immediate contact with the electrolyte, and to accomplish this, the electrode must be made very thin. It has been discovered that about 15% of the energy given off from any form of pasted plate is derived from that portion of the active material which lies at a depth greater than one thirty-second of an inch from the outer surface of the plate. In other words, it is said that about 85% of the general out put of the plate is derived from that portion of the plate which is disposed at no greater depth than one thirty-second of an inch from the surface, thus with a plate exposed to the electrolyte on two sides practically all the active material in excess of one-sixteenth of an inch in thickness is useless and only contributes to the extra weight of the cell.

It is, therefore, proposed, in the present invention to employ a form of electrode wherein the weight of the active material may be reduced and the disks hereinbefore mentioned may be described as having a thickness of approximately one-sixteenth of an inch. It is further found, in the pasted plate that when the plate is brought into action, the sluffing off of the active material commences at once and this is deposited in the bottom of the cell as sediment. It is necessary to retain this active material in order that the best results may be obtained, and in the form of electrode described as forming part of the present invention it will be appreciated that it is impossible for the active material to become dislodged and loosened from its supporting grid and as a result thereof the life of the cell is greatly increased, its capacity retained and the necessity of cleaning the battery is eliminated, while the porous material which acts as a retainer, offers the minimum resistance to the free passage of the electrolyte to the active material. Again, in the pasted plate, the warping of the plate due to the uneven expansion of the active material on "charge" and "discharge" cause short circuit of the assembled plates, and frequently causes the bursting of the jars.

The warping of the plates in the described invention is eliminated as each unit is self contained and any internal pressure from the expansion is taken up through the medium of the porous retainers. The porous material that may be used in this form of battery may be in the nature of granulated carbon, wool-glass, asbestos fiber, etc., but from practice, it is found that native glass or "volcanic scoria" in view of its lightness in weight and owing to its porous quality is best suited to this purpose. This material is formed into washer-like disks to snugly fit within the unit or battery element.

While the tube B forming the supporting grid of a battery element and specifically referred to in Figs. 1 to 8, inclusive, is provided with perforations arranged in circular series and equi-distally spaced from each other, it is desired that it be understood that any other system of perforating the tube may be resorted to.

We claim:—

1. A storage battery unit comprising a rod provided with longitudinally extending grooves arcuate shaped in cross section, a series of porous disks each provided with a centrally arranged circular opening, the wall of which bears on the longitudinally extending edges of said rod formed by said grooves, and disks of lead oxid, each provided with a centrally arranged opening of a shape corresponding to the cross section of said rod, said disks of lead oxid alternating with said porous disks.

2. A storage battery unit comprising a rod provided with longitudinally extending grooves arcuate shaped in cross section, a series of porous disks each provided with a centrally arranged circular opening, the wall of which bears on the longitudinally extending edges of said rod formed by said grooves, and disks of lead oxid, each provided with a centrally arranged opening of a shape corresponding to the cross section of said rod, said disks of lead oxid alternating with said porous disks, and a tube inclosing said disk and provided with apertures arranged opposite the peripheries of said disks of lead oxid.

3. A storage battery unit comprising a rod provided with longitudinally extending grooves arcuate shaped in cross section, a series of porous disks each provided with a centrally arranged circular opening, the wall of which bears on the longitudinally extending edges of said rod formed by said grooves, disks of lead oxid, each provided with a centrally arranged opening of a shape corresponding to the cross section of said rod, said disks of lead oxid alternating with said porous disks, a tube inclosing said disk and provided with apertures arranged opposite the peripheries of said disks of lead oxid, and lead oxid embeded in the grooves of said rod for connecting the disks of lead oxid together.

In testimony whereof we affix our signatures in presence of two witnesses.

HARRY S. HAWKINS.
ABBOTT M. GREEN.
ISAAC W. GIBBINS.

Witnesses:
C. S. BALDWIN,
ALICE HAWKINS.